UNITED STATES PATENT OFFICE.

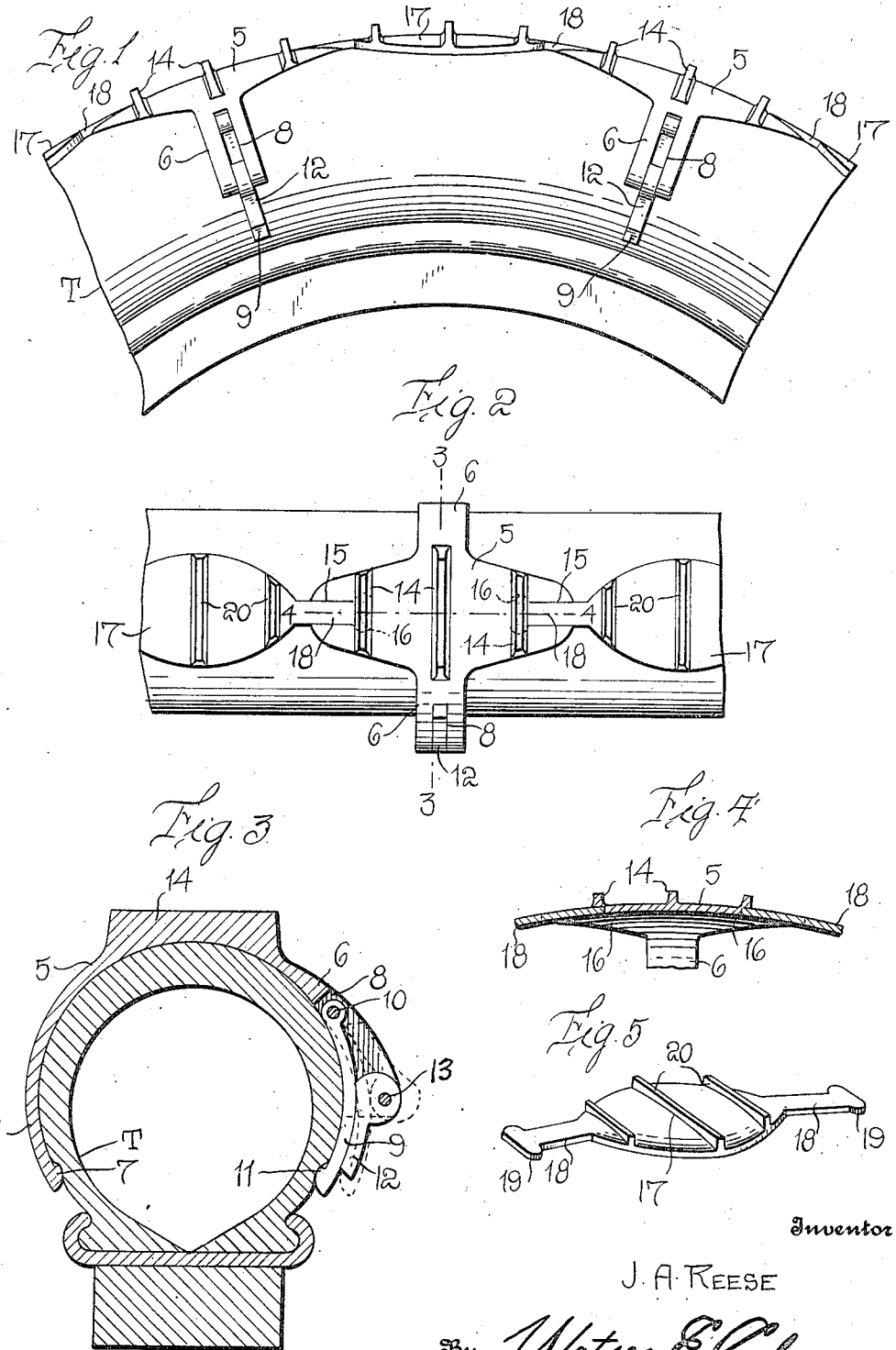

JOEL A. REESE, OF ATLANTA, GEORGIA.

ANTISKIDDING DEVICE FOR VEHICLE-TIRES.

1,256,729.  Specification of Letters Patent.  Patented Feb. 19, 1918.

Application filed July 5, 1917. Serial No. 178,757.

*To all whom it may concern:*

Be it known that I, JOEL A. REESE, a citizen of the United States, residing at Atlanta, in the county of Fulton and State of Georgia, have invented certain new and useful Improvements in Antiskidding Devices for Vehicle-Tires, of which the following is a specification, reference being had to the accompanying drawings.

This invention relates to an improved anti-skidding device for vehicle tires, and has for its primary object to provide a device of this character which is so constructed that the pressure of the tire upon the device will operate to effectually prevent its accidental detachment from applied position.

It is another and more particular object of the invention to provide a device for the above purpose, consisting of a metal shoe adapted to extend across the tread and upon opposite sides of the tire and having means on one end for engagement against the outer lateral portion of the tire casing, and a movable latch element mounted on the other end of the shoe and also having means engaging the inner lateral portion of the tire casing, said movable element being held by pressure of the tire thereon against all possibility of movement in one direction, whereby the shoe would be released.

And it is another object of the invention to provide a plurality of tread shoes each provided with releasable tire engaging means, and separable link elements, the shoes and the link elements having co-acting means whereby the same may be connected to extend circumferentially around the tire and their relative displacement transversely of the tire obviated.

It is a further general object of my invention to improve and simplify the construction of devices of the above character and to enable the same to be very easily and quickly applied or removed from the tire, and to also render the same very reliable and efficient for the purpose in view.

With the above and other objects in view, my invention consists in the novel features of construction, combination, and arrangement of parts to be hereinafter more fully described, claimed, and illustrated in the accompanying drawing, in which, Figure 1 is a fragmentary side elevation showing my improved anti-skidding device applied to a wheel tire;

Fig. 2 is a top plan view;

Fig. 3 is a section taken on the line 3—3 of Fig. 2, the latch lever being shown in dotted lines in its released position;

Fig. 4 is a section taken on the line 4—4 of Fig. 2; and

Fig. 5 is a perspective view of one of the connecting links.

Referring in detail to the drawing, 5 designates the body of the tread shoe which is in the form of an elongated metal plate or casting which is slightly curved longitudinally and has a concave under face to seat upon the periphery of the wheel tire indicated at T. The relatively narrow side portions 6 of the shoe are centrally formed upon opposite sides of the shoe body 5 and are adapted to fit snugly against the opposite side faces of the tire. One of the arms 6 of the shoe is provided upon its terminal with an inwardly projecting shoulder 7 which is adapted for engagement with one side of the tire casing.

The other arm 6 of the shoe is relatively short and is bifurcated or slotted, as seen at 8. In the inner end of this slot, one end of a latch lever 9 is pivotally mounted upon a pin 10 which is fixed in the arm 6 and traverses said slot. The other or free end of the lever 9 is formed with an inwardly projecting shoulder 11 for engagement against the inner lateral portion of the tire casing. The spaced portions of the arm 6 gradually increase in width to their ends, and between the relatively wide end portions of said arm a cam lever 12 is pivotally mounted upon a transverse pin 13 fixed at its ends in the spaced portions of the arm. From reference to Fig. 3 of the drawing, it will be observed that when this cam lever is forced inwardly, the cam portion thereof bearing against the latch lever 9 urges the latter in an inward direction so that the shoulder 11 will grip the tire casing adjacent its inner edge. By pulling the lever 12 outwardly, the cam portion thereof is removed from bearing engagement on the latch lever so that the lever 9 may swing outwardly in the arm 6, whereby the shoe can be removed from the tire.

The tread face of the body plate 5 of the shoe is of convex curvature both longitudinally and transversely, and spaced transverse traction cleats or ribs 14 are integrally formed therewith, one of said cleats being preferably at the center of the shoe and the other relatively short cleats being located in spaced relation to the opposite ends of the shoe. The ends of the shoe plate 5 are formed with the longitudinally extending slots 15 which communicate at their inner ends with relatively wide pockets or recesses 16 formed in the bottom faces of the cleats 14.

In conjunction with my improved tread shoes, connecting links may be employed so that a series of the shoes arranged in spaced relation around a wheel tire can be connected to each other and held against relative longitudinal movement, though it will be understood that I reserve the privilege of using such tire shoes independently of the connecting links. Each of the links consists of a substantially oval-shaped metal plate 17 having arms 18 extending from its ends longitudinally of said plate, said plate and the arms being slightly curved longitudinally to fit snugly against the tread face of the tire. The terminals of the arms 18 are formed with heads or enlargements 19, and upon the convex face of the link plate 17, spaced transverse ribs or cleats 20 are formed.

In assembling the several parts of the device, the link 17 is arranged upon the top portion of the wheel tire and the shoe then disposed in position for engagement with one end of the link and pressed down to fit upon the tire. The shoe may be very easily positioned with the application of but little force, owing to the fact that the lever 9 is in the release position as shown in dotted lines in Fig. 3. After the shoe has been properly seated upon the tire, the cam lever 12 is then forced downwardly and against the latch lever 9 to urge the latter into tight frictional engagement upon the side of the tire casing, so that the shoulder 11 will securely grip the casing inwardly of the axial center of the tire. This operation also causes the shoulder 7 on the other arm 6 to bite into the wall of the tire casing. Thus, it will be seen that the tread shoes can be easily and quickly applied by the operator even while standing on the running board of the machine, and when the machine is stalled in a mud hole or sand bog, the use of the connecting links 17 can be dispensed with and the shoes applied at intervals to the tire. However, it is entirely practicable to connect the tread shoes by means of the links 17, entirely around the tire. The pressure of the wheel tire also continues to act against the latch levers as the shoes successively bear the weight of the load and tend to further force said levers inwardly into tight holding engagement with the tire wall. The cleats upon the shoe plates and the link members engaging with the road surface, afford the necessary tractive purchase so that sliding or skidding movement of the wheel is obviated.

From the foregoing description, taken in connection with the accompanying drawing, the construction, manner of operation and several advantages of the device will be clearly and fully understood. The invention is very effective and reliable in practical operation and, as will be manifest, can be very easily and quickly applied to the wheel tire or removed therefrom and, when applied, is not liable to accidental detachment. The necessity of employing chains or other analogous holding means, the application of which to the tire is more or less difficult, is avoided. The device as a whole is also quite simple as well as strong and durable in its construction, and can be produced at relatively small manufacturing cost.

While I have herein shown and described the preferred construction and arrangement of the several elements, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. An anti-skidding device for wheel tires including a series of tread shoes each having means for releasably holding the same in applied position upon the tire, each tread shoe embodying a plate having recesses formed in its inner face in spaced relation to its ends, and connecting links for said shoes provided with terminal means to seat in said recesses.

2. An anti-skidding device for wheel tires including a series of tread shoes each having means for releasably holding the same in applied position upon the tire, each tread shoe embodying a plate having recesses formed in its inner face in spaced relation to its ends, each shoe also having longitudinal slots in its ends communicating with the respective recesses, and connecting links for said shoes having arms provided with enlarged terminals, said arms being adapted for engagement in said slots and the terminals of the arms seating in said recesses.

3. An anti-skidding device for wheel tires comprising a shoe having an elongated body plate, and tire engaging arms projecting from the opposite side edges of said plate, one of said arms having terminal means for engagement upon the outer lateral portion of the tire, and a movable latch element mounted in the other of said arms and also having terminal means for engagement with the tire, and means to urge said element to its effective position.

4. An anti-skidding device for wheel tires comprising a shoe having an elongated body plate and tire engaging arms projecting from the opposite side edges of said plate, one of said arms having terminal means for engagement upon the outer lateral portion of the tire, a movable latch element mounted in the other of said arms and also having terminal means for engagement with the tire, and a relatively movable member mounted in said arm to co-act with the latch element and retain the same in engagement with the tire.

5. An anti-skidding device for wheel tires comprising a shoe having an elongated body plate and tire engaging arms projecting from the opposite edges of said plate, one of said arms having terminal means engaged upon the outer lateral portion of the tire, a latch lever pivotally mounted at one of its ends in the other of said arms and having means on its other end to engage over the inner lateral face of the tire, and a cam lever mounted in said arm to co-act with the latch lever and releasably hold the same in effective position.

In testimony whereof I hereunto affix my signature in the presence of two witnesses.

JOEL A. REESE.

Witnesses:
J. E. McCollough,
E. J. White.